United States Patent [19]

van Geel et al.

[11] 4,340,160
[45] Jul. 20, 1982

[54] OVERFLOW SYSTEM HAVING PNEUMATIC PRESSURE CONTROL

[75] Inventors: Jacobus N. C. van Geel, Retie; Frans M. Dobbels, Dessel; Walther A. H. Theunissen, Hamont, all of Belgium

[73] Assignee: Deutsche Gesellschaft fur Wiederaufarbeitung, Fed. Rep. of Germany

[21] Appl. No.: 124,297

[22] Filed: Feb. 25, 1980

[30] Foreign Application Priority Data

Feb. 27, 1979 [GB] United Kingdom ............... 7906813

[51] Int. Cl.³ ............................................. B22D 39/06
[52] U.S. Cl. ................................. 222/595; 222/394; 65/130
[58] Field of Search .................... 65/130, 329, 21; 222/394, 396, 397, 420, 478, 405, 595; 164/119, 306; 264/5; 425/6

[56] References Cited

U.S. PATENT DOCUMENTS

| | | | |
|---|---|---|---|
| 1,797,206 | 3/1931 | Howard | 65/130 |
| 1,999,749 | 4/1935 | Bates | 65/130 |
| 2,020,143 | 11/1935 | Haub | 65/130 |
| 2,713,705 | 7/1955 | Lapin | 222/595 X |
| 3,266,881 | 8/1966 | Novack et al. | 65/130 |
| 3,499,580 | 3/1970 | Smith | 222/595 |
| 3,675,911 | 7/1972 | Kapun | 222/595 X |

FOREIGN PATENT DOCUMENTS

11556 3/1910 France ............................ 65/329

*Primary Examiner*—David A. Scherbel
*Attorney, Agent, or Firm*—Allegretti, Newitt, Witcoff & McAndrews

[57] ABSTRACT

The invention covers a method as well as a device for controlling the discharge of molten material from a melter or an intermediate vessel containing such material, in which a primary outflow from the melter or intermediate vessel is fed to an overflow system the working level of which is regulated through the use of pneumatic pressure on a communicating chamber pertaining to the overflow system. Molten material may be led into a primary overflow through the use of a pneumatic lift.

4 Claims, 10 Drawing Figures

OVERFLOW SYSTEM HAVING PNEUMATIC PRESSURE CONTROL

This invention relates to a method for controlling the discharge of molten material from a vessel containing the same, and to a device suitable for performing such method.

The new method and device according to the invention have been designed in view of specific problems arising in the treatment of melts which problems resulting from solidification and vitrification processes of radioactive materials, in particular of High Level Radioactive Liquid Wastes (HLRLW).

The improved performance and greater safety in controlling the discharge of molten material, afforded by said new method and device according to the invention, is however not bound specifically to embodiments in which radioactive melts are treated. Such new method and device may in fact find an application in any process for pouring molten materials where a close control and regulation of the melt flow is required.

The invention therefore covers a method and device as set forth herebelow, for obtaining close control of a discharge flow of any molten material from a vessel containing such.

It will of course be clear that the hazards connected to the handling of melts resulting from the solidification and vitrification process of H.L.R.L.W. will set very severe requirements to the methods and devices used therefor. Any method for handling such melts should thus include as little as possible mechanical means, which are liable to improper working, should be operable and maintainable by remote means, and should furthermore be as reliable as possible in the accuracy and safety of its performance.

Such method should further also include provisions for the immediate shut down of the performance in case of emergency situations.

The vitrification units developed so far for the solidification of H.L.R.L.W. are not based on a continuous outflow of the melter, but on a discontinuous discharge by batches of 20 to 50 liters per cycle. The vitrification units are hitherto equipped with a freezing valve, located at the bottom of the vitrification unit, or the batches are discharged by tilting the melter at one side and allowing the melt to pass an overflow on the other side. Such techniques are reviewed in "Techniques for the Solidification of High Level Wastes", Technical Report Series nr. 176, IAEA, Vienna, 1977 and by C. C. Chapman, H. T. Blair and W. F. Bonner in "Experience with Waste Vitrification Systems at Battelle-Northwest", in Radioactive wastes from the nuclear fuel cycle, AICHE Symposium Series 154 vol. 72, p. 151, 1976, edited by R. E. Tomlinson.

These systems involve cumbersome technology particularly as the production of radioactive glass requires equipment with a high reliability and which has to be remotely operated during long periods of operation.

Thus, the frequent use of a freezing valve has a detrimental effect on the mechanical and corrosion stability of the melter, made of a high corrosion resistant alloy or of a ceramic material. Frequent temperature changes of hundreds of degrees C. will initiate embrittlement of the metallic parts of the melter and/or cracks in its ceramic parts. A further inconvenience of this type of discharge system is that it never guarantees a quick "stop" when desired, as the glass remaining in the discharge tube represents a non-negligible heat content and needs a certain time to cool down.

The tilting method on the other hand, results in a retarded outflow of glass, equal to the volume of melt required to fill the discharge tube.

Another inconvenience of the existing types of valve is that the discontinuous discharge of large volumes over a relatively short period of time implies a large volume of the melter. It is obvious that a Joule heated melter can only be partly discharged by batches which are relatively small compared to the total melter volume, in order to ensure a permanent heating by a Joule effect. Continuous discharge of a Joule heated melter would on the other hand require a relatively small volume as the latter is only determined by the residence time needed for the melting capacity of the melter, or evaporation capacity if the input to the melter is an aqueous solution. A small melter volume is of particular advantage in nuclear industry as the dismantling and remote replacement of the equipment becomes more cumbersome, the larger the dimension of the equipment.

It has now been found that the method and device in accordance with the invention as set forth hereafter will avoid the drawbacks of the techniques known to this date, and will provide further fundamental advantages in respect to the safe handling of a flow of molten material, in particular of radioactive melts.

This invention therefore covers a method for controlling the discharge of molten material from a melter or an intermediate vessel containing such material, in which a primary outflow from the melter or intermediate vessel is fed to an overflow system, the working level of which is regulated by means of pneumatic pressure in a communicating chamber pertaining to said overflow system.

More particularly such method may concern the control of the outflow of molten material flowing from a primary overflow of a melter or intermediate vessel, whereby the outflow from said primary overflow is fed to a further overflow system comprising at least one outlet nozzle, the working level of said further overflow system being regulated pneumatically.

These fundamental features of the invention make it possible to very closely control the discharge flow and flow rate of the molten material, by acting on the gas pressure in the pressure chamber communicating with the actual overflow chamber of the overflow vessel. Such pneumatic regulation means indeed allow an accurate and fast control of the liquid level of molten material at the nozzle of the overflow vessel, which results in an increase or reduction of the flow rate of molten material, as a function of the availability of said material at the inlet of the overflow nozzle; pulsation of the gas pressure in the communicating chamber during discharge allows a pseudo-continuous discharge of molten material in the form of marble size drops of molten material; such pneumatic regulation means furthermore allow for a very sudden shut down of the discharge operation, as any post-flow from the primary outlet of the melter or intermediate vessel may easily be absorbed in the overflow vessel by acting on the pressure in the communicating chamber.

According to another feature of the invention, there is provided a method for controlling discharge of molten material through an overflow of a melter or intermediate vessel by leading the molten material into said overflow by means of a pneumatic lift system.

This feature of the invention does on the one hand provide the possibility of discontinuous discharge of batches of large volumes, and on the other hand may provide for the substantially complete draining of the production vessel in the case such draining should be required, by using a pneumatic lift system which reaches sufficiently deep into said production vessel.

In a preferred embodiment of the invention, the method for controlling the discharge of molten material comprises controlling the flow of molten material through a primary overflow by means of a pneumatic lift system and the outflow of molten material from said primary overflow by means of a pneumatically regulated overflow system.

According to a further feature of the invention, the pneumatic lift system used for controlling the flow of molten material to the primary overflow may comprise canalization means dipping into the molten material in said melter or intermediate vessel, and suction means connected thereto.

In a further preferred embodiment of the method according to the invention, the pneumatically regulated overflow system is provided on a movable lifting device supporting said system at, against or under the primary outflow from the molten or intermediate vessel, thus allowing the easy remote mounting, removal and replacement of said overflow system.

This latter embodiment of the invention in fact provides a clear illustration of a very fundamental feature and advantage of the invention.

Whereas indeed in the vitrification units of the known state of art, the outflow valve always had to be firmly and tightly connected and secured to the bottom of the melter or production vessel, on the contrary in the method and device according to the invention the outflow "valve system," consisting in the pneumatically regulated overflow system, may be provided entirely separated from the production vessel.

This allows a much easier and safer replacement and-/or maintenance of said "valve system," as remote means are much easier to apply in such case.

In still a further preferred embodiment of the invention the pneumatically regulated overflow system is applied in close contact against the outer walls of the outlet for the primary outflow, so as to allow vapour venting and/or atmosphere controlling around the primary outflow and over the overflow system.

According to another very convenient feature of the invention, the pneumatically regulated overflow system is provided with heating means for maintaining the molten material at suitable temperature.

In the method of the invention it may further also be very suitable to provide the pneumatically regulated overflow system with a plurality of outlet nozzles placed at successive overflow levels, so as to directly cope with any nozzle obstruction.

The invention on the other hand also covers a device for controlling the discharge of molten material from a melter or an intermediate vessel containing such material, such device comprising:

a melting vessel or intermediate vessel for molten material, comprising an outlet for molten material;

an overflow discharge unit provided under said outlet and comprising:

(1) an overflow chamber provided with at least one outlet nozzle at its overflow level(s), and (2) a pressure chamber provided with pressure regulation means and communicating with said overflow chamber.

In a preferred embodiment of the invention, the device comprises:

a melting vessel or intermediate vessel for molten material, comprising an overflow outlet and a pneumatic lift arrangement consisting of (1) canalization means, dipping into said vessel and leading to or into said overflow outlet, and (2) suction means connected to said canalization means;

an overflow discharge unit provided with heating means for maintaining it at suitable temperature and comprising:

(1) an overflow chamber provided with at least one outlet nozzle at its overflow level(s), and (2) a pressure chamber provided with pressure regulation means and communicating with said overflow chamber;

said overflow discharge unit being supported by a movable lifting device and closely applied against said melting or intermediate vessel, under said overflow outlet.

In such device according to the invention, the overflow vessel may very suitably be provided with a plurality of outlet nozzles at successive overflow levels of said vessel.

The constituting parts of the melting vessel or intermediate vessel and of the overflow vessel are preferably made of refractory and insulating materials.

The new method and device for controlling the discharge of molten material, in accordance with this invention as set forth hereabove:

avoids the fundamental drawbacks connected to the vitrification units of the known state of art;

allows for the discharge of melt batches having a size ranging from droplet or bead sizes, through marble sizes, to volumes up to 100 liters and even more;

avoids any sudden or gradual temperature changes as well as the use of any mechanical or moving parts;

allows for the immediate shut-down of the outflow without any significant delayed flow of melt;

allows a relatively small volume of the melting section;

allows for either a continuous or a discontinuous discharge flow of melt;

allows to guarantee a flow rate at the outlet nozzle which at any time corresponds to the flow rate of the feed to the melter, even if such feed flow is very low;

reduces the risks of leakages of melt through the walls of the installation, by allowing Joule heating between the discharge unit and the refiner, with walls that are cooler than the actual melt.

The performance of the new method, and the new device in accordance with the invention, as well as further features and details thereof will appear from the following detailed description, in which reference is made to the accompanying drawings which represent by way of purely illustrative examples some specific embodiments of discharge means for molten material according to the invention.

In these drawings.

In these various figures, like reference characters are employed to designate the same parts.

Figure 1:
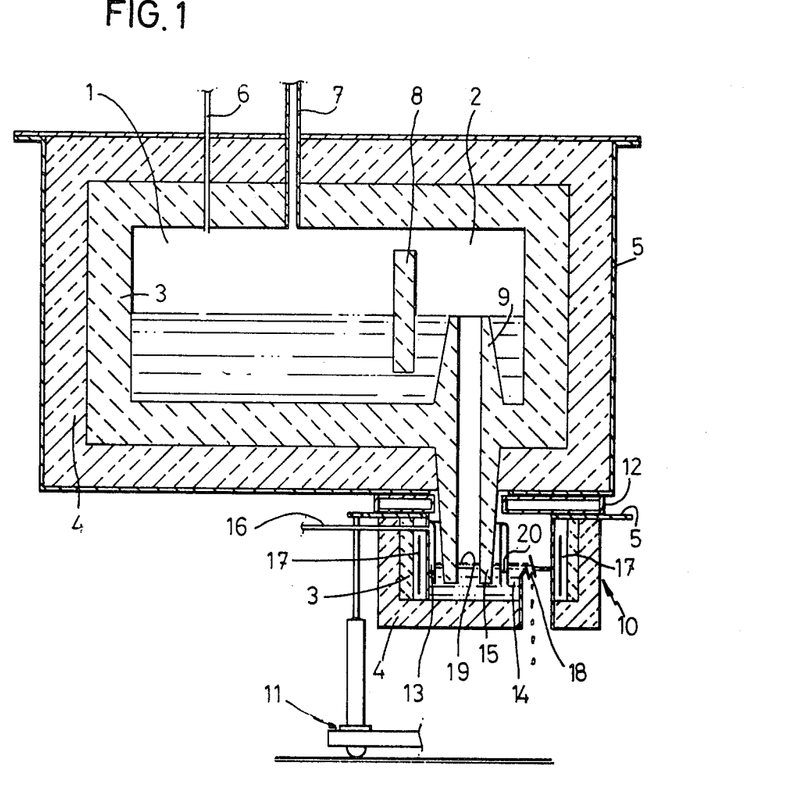
FIG. 1 represents a cross section of a first embodiment of a device according to the invention, designed for the continuous discharge of melt in droplet or marble size volumes.

In the exemplary embodiment of FIG. 1, the device comprises a melter compartment 1 and a refiner compartment 2, made of refractory material 3, insulating material 4, and steel casing 5.

The device further comprises an inlet 6 for continuous feeding with radioactive liquid or solid high level waste and a weighed flow of glass-forming additives, and an outlet 7 for off gases.

The melter compartment 1 is heated by electrical resistance or Joule heating means (not represented) and is separated from the refiner compartment 2 by a ceramic baffle 8, preventing the crust floating on the glass in the melter 1 from entering the refiner 2.

The vitrous melt formed in the melter 1 flows to the refiner 2 and from there flows into a refractory ceramic overflow 9.

The device further comprises a discharge unit 10, consisting of an overflow vessel, made of refractory material 3, insulating material 4 and steel casing 5.

The discharge unit 10 is supported on a lifting device, generally indicated by the reference character 11, applying said unit 10 against the bottom of the production melter refiner vessel 1-2.

The refractory ceramic overflow 9 is Joule heated by applying a voltage between the glass melt in the discharge unit 10 and an electrode (not shown) placed in the glass melt near the entrance of said primary overflow 9.

A cooling provision 12 may be placed between said discharge unit 10 and the vessel 1-2.

The discharge unit 10 itself comprises a pressure chamber 13, communicating with the actual overflow chamber 14 of the discharge unit 10. The communicating pressure chamber 13 has an annular shape, adapted to be placed around the outlet 15 of the overflow 9, and is provided with a pneumatic pressure conduit 16, though which the pressure chamber is maintained slightly pressurised under discharge conditions.

The melt in the discharge unit 10 is maintained at the desired viscosity for the discharge by means of electric heating resistance 17. The melt entering the discharge unit 10 from the overflow 9 finally leaves it through a discharge nozzle provided at the overflow level of said unit 10.

Depending on the melt level 19 in the overflow chamber 14, regulated through the melt level 20 in the communicating pressure chamber 13, the melt is discharged through the nozzle 18 either dropwise (production rates of 1 to 10 liters of melt per hour) or as a continuous flow (at higher production rates).

When a very quick or substantially immediate shut down of the discharge is required, the over-pressure in the communicating chamber 13 is released (and the feeding to the melter 1 is interrupted), causing the melt level 19 in the overflow chamber 14 to drop instantaneously. Any postflow dripping from the overflow 9 into the discharge unit 10 is thereby retained in the discharge vessel by regulating the melt level 20 in the communicating chamber 13.

Figure 2:
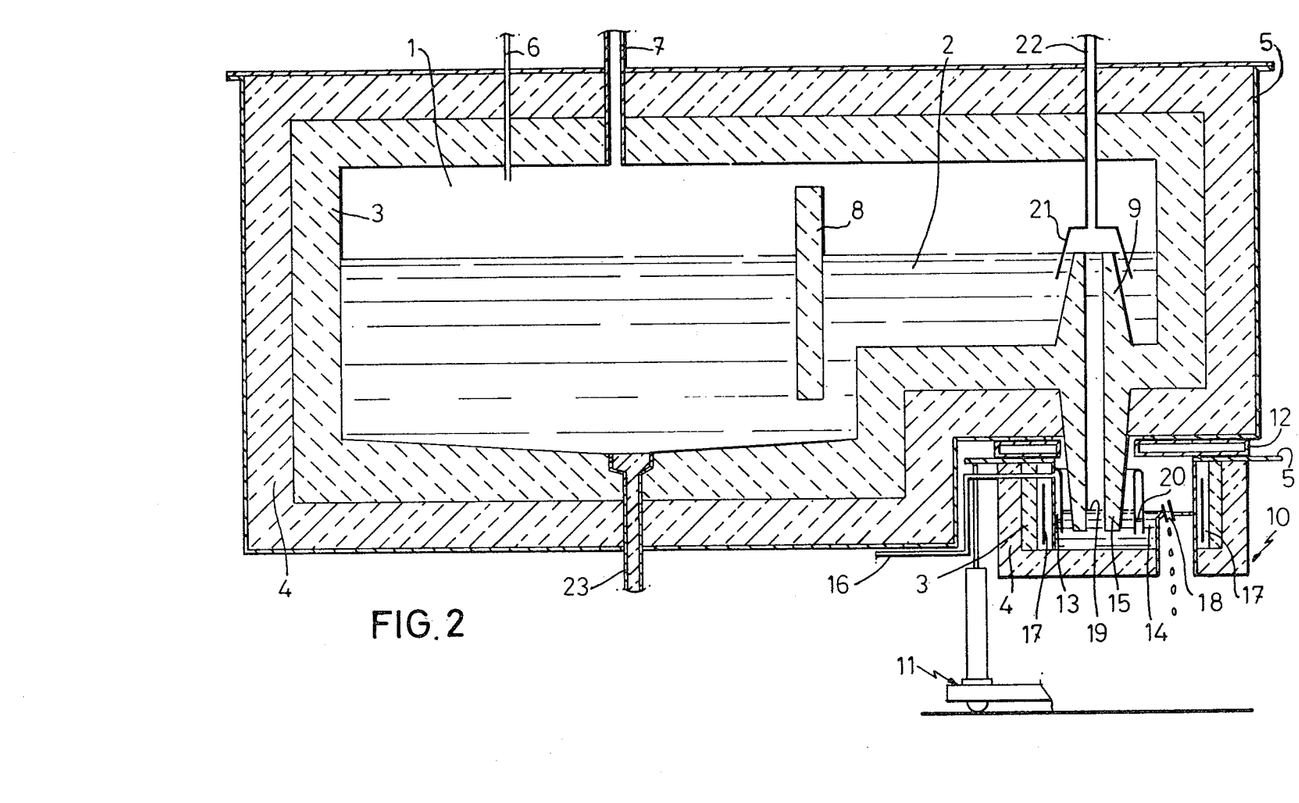
FIG. 2 represents a cross section of a variant of the device according to FIG. 1, designed for additionally allowing a discontinuous discharge of batches of variable volume.

In a variant of this device, shown in FIG. 2, the refiner 2 is provided with a metallic or a ceramic cap 21, covering the overflow 9 and provided with a pressure tube 22. By applying a small under-pressure in tube 22, the melt is sucked up in cap 21 and tube 22. The cooperation of cap 21 and overflow 9 thereby act as a pneumatic lift arrangement and causes the melt to flow by gravity to the discharge unit 10. The flow rate of the melt is controlled by the under-pressure in tube 22. A quick shut down of the discharge is realized by releasing the under-pressure in tube 22 and the over-pressure in communicating chamber 13.

The construction according to FIG. 2 can thus be used either for continuous discharge as explained hereabove in connection with FIG. 1, by using merely the overflow provision 9 of the device, or for discontinuous discharge by batches of up to 25 liters by using the pneumatic lift provision 21-22 of the device.

The device according to FIG. 2 further comprises a draining bottom outlet 23.

Figure 3:
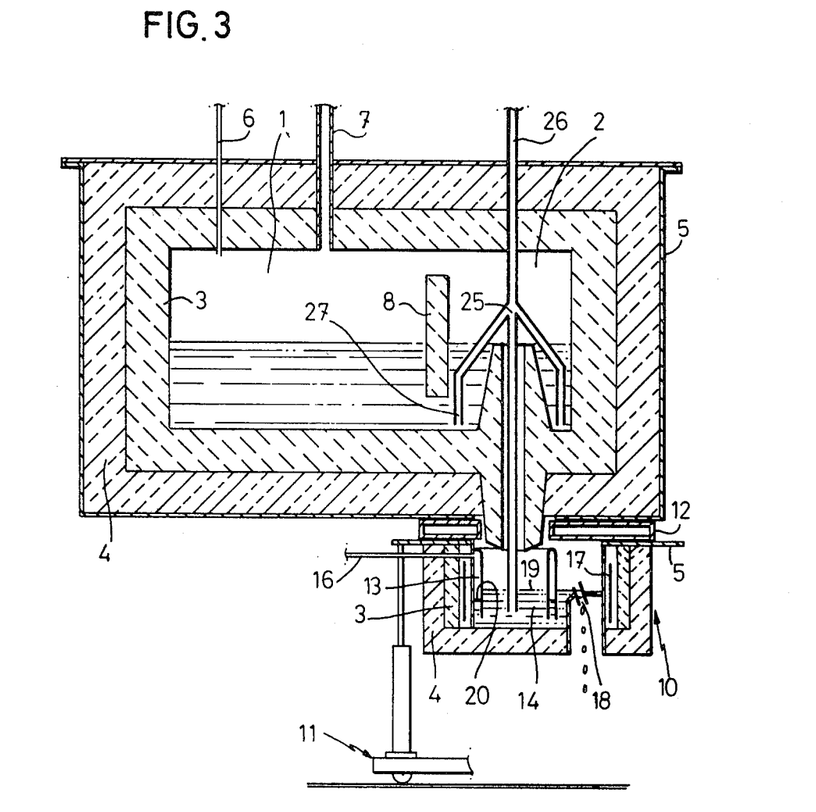
FIG. 3 represents a cross section of a further variant of the devices according to FIGS. 1 and 2, designed for additionally allowing discharge of larger batches, or even substantially draining the production vessel.

The embodiment of the invention shown in FIG. 3 constitutes in fact a further variant of the embodiments of FIGS. 1 and 2, comprising a separate pneumatic lift arrangement 25 having a suction tube 26 and tubes 27 reaching near to the bottom of the melter-refiner vessel 1-2. This provision does allow for the discontinuous discharge of much larger batches through the pneumatic lift arrangement 25-26-27 (up to 100 liters) or even for the almost complete draining of the melter-refiner vessel 1-2, as well as for the continuous overflow discharge, in accordance with the device of FIG. 1, through the overflow 9.

Figure 4:
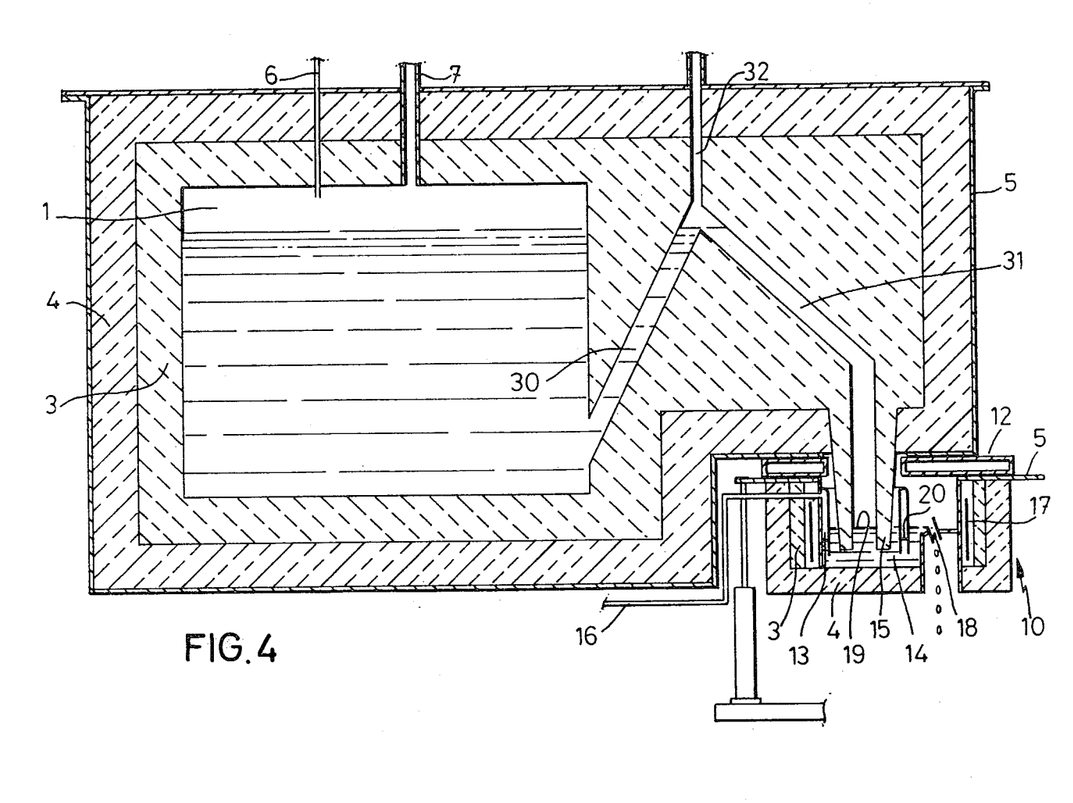
FIG. 4 represents a cross section of a further embodiment of a device according to the invention, designed for allowing both continuous and discontinuous discharge.

In the embodiment of FIG. 4, the refiner compartment 2, the overflow provision 9 and the pneumatic lift arrangement 21-22 and 25-26-27 according to FIGS. 2 and 3, are replaced by a ceramic block in which pathways 30, 31 for the melt and a suction tube 32 have been drilled.

This provision allows either the continuous discharge of melt as explained in connection with FIG. 1 by merely using the arrangement of pathways 30, 31 as an overflow arrangement, or for the discontinuous discharge of melt or the draining of the melter 1, by using the arrangement of pathways 30, 31 and suction tube 32 as a pneumatic lift arrangement.

Figure 5:
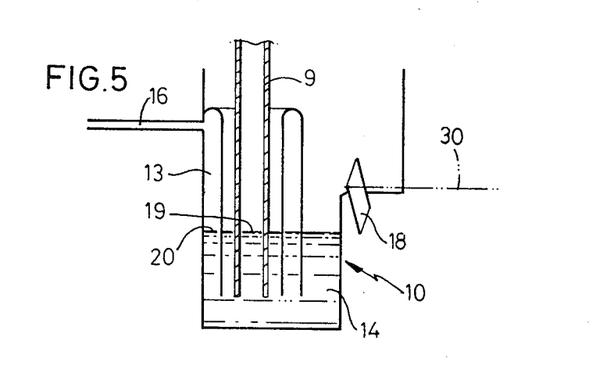
FIGS. 5 to 7, each represent a cross section of the discharge valve of the device according to FIG. 1, each showing a different situation in the performance of said valve.
Figure 6:
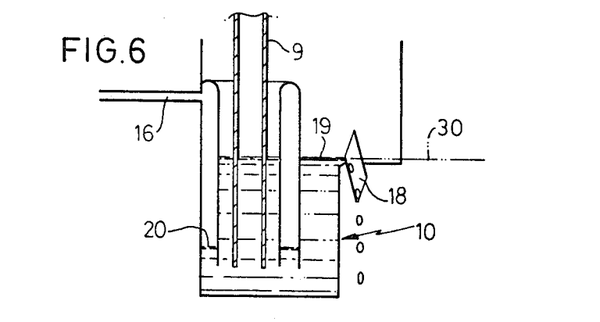
Figure 7:
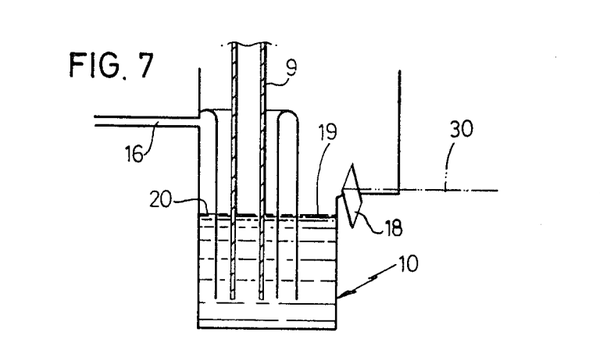

The working of the continuous discharge method according to the invention can be further explained having reference to FIGS. 5 to 7 of the attached drawings.

When no primary outflow reaches the discharge unit 10 through overflow 9, the situation is as shown in FIG. 5, while no pressure is applied in the communicating chamber 13; the melt level 19 in the actual overflow chamber 14 and the melt level 20 in the communicating chamber 13 are identical and lie below the overflow level 30 of the discharge unit 10.

When a melt feed reaches the discharge unit 10, through the overflow 9, the liquid melt level therein rises to the overflow level 30 (as shown in FIG. 6), owing also to the application of an over-pressure on the melt in communicating chamber 13.

By closely regulating this over-pressure in chamber 13 as a function of the rather irregular feed flow from overflow 9, it is possible to obtain a very regular dropwise flow rate of melt through the discharge nozzle 18. When the discharge has to be interrupted, the over-pressure in communicating chamber 13 is released and the melt level 19 in overflow chamber 14 instantaneously drops substantially below the overflow level 30 (as shown in FIG. 7). This lowered level in the discharge unit 10 does allow for the absorption of any postflow of melt dripping into said vessel from the overflow 9, even after shutdown of the feeding to the production vessel 1–2.

Figures 8, 9, 10:
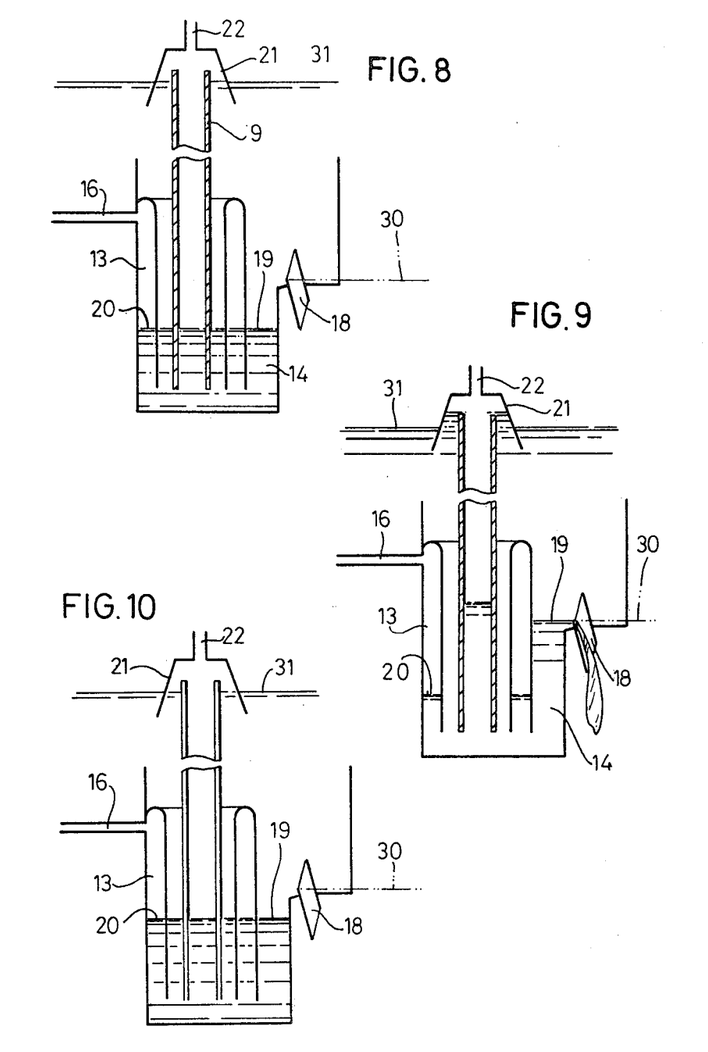
FIGS. 8 to 10, each represent a cross section of the discharge valve of the device according to FIG. 2, each showing a different situation in the performance of said valve.

The working of the discontinuous discharge method according to the invention can on the other hand be further explained having reference to FIGS. 8 to 10 of the attached drawings.

When the liquid melt level 31 in the production vessel 1–2 is lower than the inlet of the overflow 9, and when no suction is applied to the suction tube 22, the situation is as shown in FIG. 8. No primary outflow thus reaches the discharge unit 10.

When a suction is applied to the suction tube 22, the liquid melt level rises in cap 21, whereby the arrangement of cap 21 and overflow 9 act as a pneumatic lift arrangement (as shown in FIG. 9).

There is then also applied an over-pressure in the communicating chamber 13 and consequently the liquid melt level 19 in the overflow chamber 14 rises to above the overflow level 30. The entire batch of melt that is being lifted into the overflow 9 by virtue of the suction in tube 22 is thus discharged through the discharge nozzle 18.

When the discharge has to be interrupted, the suction in suction tube 22 and the over-pressure in communicating chamber 13 are released, thus providing an instantaneous drop of the melt level 19 in the overflow chamber 14 below the overflow level 30 (as shown in FIG. 10).

The applications of the invention will now be illustrated by means of the following examples.

EXAMPLE 1

The melter as shown in FIG. 1 is continuously fed with a mixture of solid glass forming additives and solid calcined high level liquid waste. For feed rates up to 10 kg per hour, vitrous melt drips from nozzle 18 on a rotating stainless steel disc in accordance with the process described in British Pat. No. 1,446,016. After solidification by natural cooling, the formed glass beads are blown off from the disc by pressurized air. Bead production can be interrupted by releasing the over-pressure in compartment 13 and ceasing feeding the melter 1.

EXAMPLE 2

The device, shown on FIG. 1, can also be used for the production of glass marbles with a diameter of 1 to 2 cm. The melter 1 is fed as described in Example 1. By pressurizing compartment 13 for fixed periods (pulsation), glass volumes of 2 to 5 cm$^3$ are obtained. Marbles can be made from these batches when they fall on two counter-rotating cylinders, lined parallel to each other and continuously wetted by a coolant. The partially cooled marbles flow by gravity inside a turning drum, continuously lined with soot and slightly inclined to allow continuous discharge by gravity.

EXAMPLE 3

The apparatus as shown on FIG. 2 can also be used for discontinuous discharge, due to the presence of cap 21. The melter 1 is fed with radioactive liquid or solid high level waste, mixed with glass forming additives. Discontinuous discharge of the furnace by batches of about 25 liters is realized by creating a slight underpressure in tube 22. The discharge is stopped by releasing this under-pressure in tube 22. An immediate full stop of the glass flow is obtained by releasing both the under-pressure in tube 22 and the over-pressure in compartment 13.

EXAMPLE 4

The shape and design of cap 21, shown in FIG. 2, has been modified to a pneumatic lift arrangement 25 as illustrated in FIG. 3. Bead production is possible by the same procedure as described in Example 1. Marbles of 2 to 5 ml can be produced by applying the procedure of Example 2. Glass blocks with a volume up to 100 liters are made by the procedure of Example 3.

EXAMPLE 5

Overflow 9 and cap 21, shown in FIG. 2 are replaced by a ceramic block (type ZAC 1681 RT) in which pathways for the melt according to FIG. 4 are drilled. Underpressures are realized via tube 32. Glass beads are produced by the procedure given in Example 1. Marbles of 2 to 5 ml are made by the procedure described in Example 2. Glass blocks up to 100 liters can be made as given in Example 3.

In view of the above specification of the invention it must be evident that said invention is not limited to the details disclosed in the specific description hereabove of certain embodiments thereof having reference to the attached drawings or to the given examples, and that numerous modifications may be provided to said details without leaving the general outline of the invention as define in the following claims.

We claim:

1. Device suitable for controlling the discharge of a molten material from a melter, characterized in that it comprises:
 - a melting vessel for molten material, comprising a tubular overflow outlet having an inlet at the surface of the molten material and an outlet end therebeneath for molten material;
 - an overflow discharge unit provided under said outlet and comprising:
   - (a) an overflow chamber provided with at least one outlet nozzle at its overflow level(s), and
   - (b) an annular pressure chamber surrounding said outlet end of said tubular overflow outlet, said tubular overflow outlet extending into said overflow chamber below said overflow level, said pressure chamber provided with pressure regulation means and communicating with said overflow chamber.

2. Device suitable for controlling the discharge of a molten material from a melter, characterized in that it comprises:
 - a melting vessel for molten material, comprising an overflow outlet and a pneumatic lift arrangement consisting of canalization means, dipping into said vessel and leading to said overflow outlet, and suction means connected to said canalization means;

an overflow discharge unit under said outlet provided with heating means for maintaining it at suitable temperature and comprising:
(a) an overflow chamber provided with at least one outlet nozzle at its overflow level(s), and
(b) a pressure chamber provided with pressure regulation means and communicating with said overflow chamber; said overflow discharge unit being supported by a movable lifting device and closely applied against said melting vessel, under said overflow outlet.

3. Device according to claim 2, characterised in that the discharge unit is provided with a plurality of outlet nozzles at subsequent overflow levels of said overflow chamber.

4. Device according to claim 2, characterized in that the melting vessel and the discharge unit are made of refractory and insulating materials.

* * * * *